Figure 1:
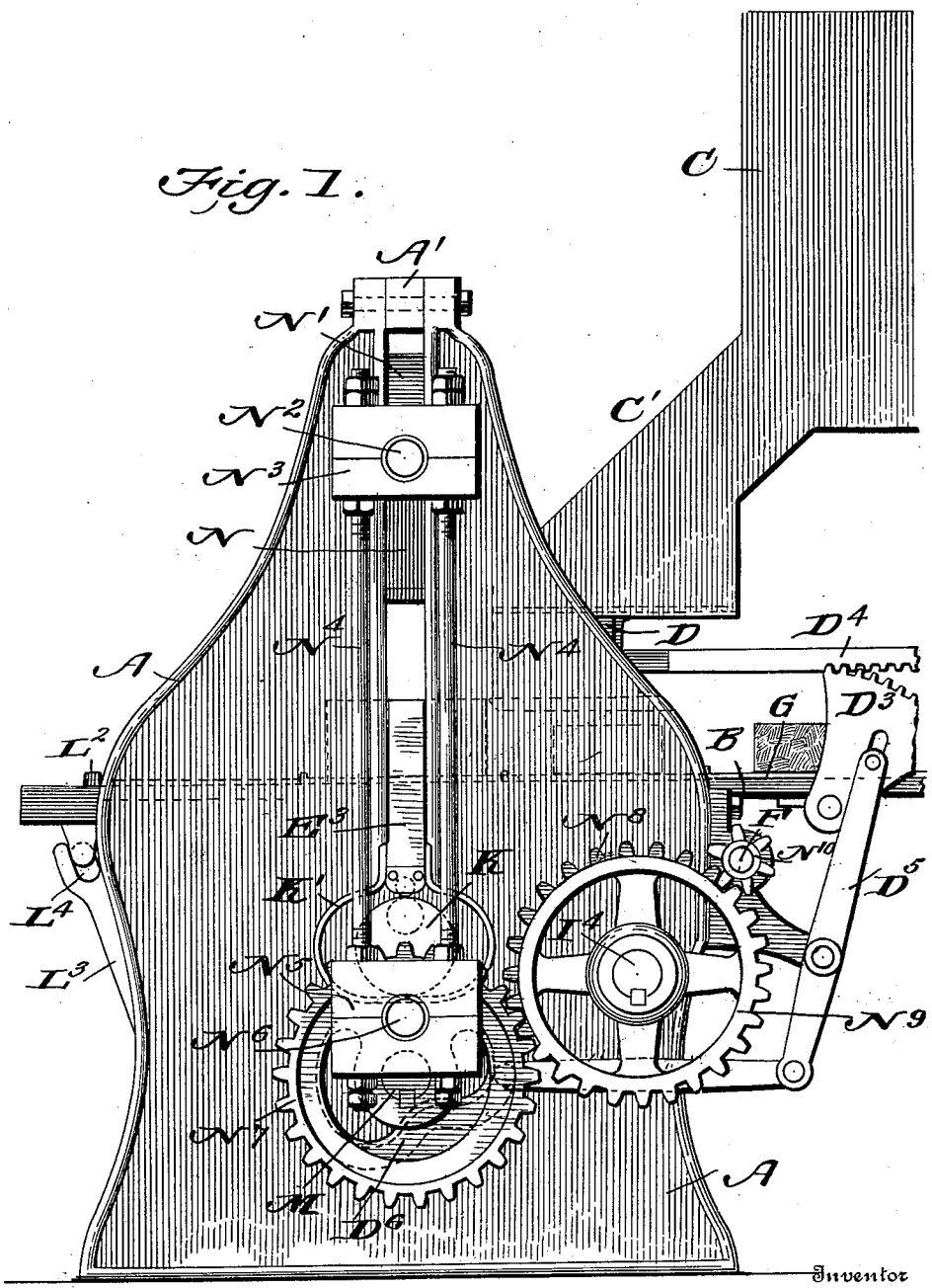

No. 700,746. Patented May 27, 1902.
C. G. DAVIES.
MACHINE FOR MOLDING BRICKS OR BLOCKS.
(Application filed Aug. 1, 1901.)
(No Model.) 4 Sheets—Sheet 1.

Witnesses
M. D. Blondel,
C. Shaw

Inventor
C. G. Davies.
By
Attorneys

No. 700,746. Patented May 27, 1902.
C. G. DAVIES.
MACHINE FOR MOLDING BRICKS OR BLOCKS.
(Application filed Aug. 1, 1901.)
(No Model.) 4 Sheets—Sheet 2.
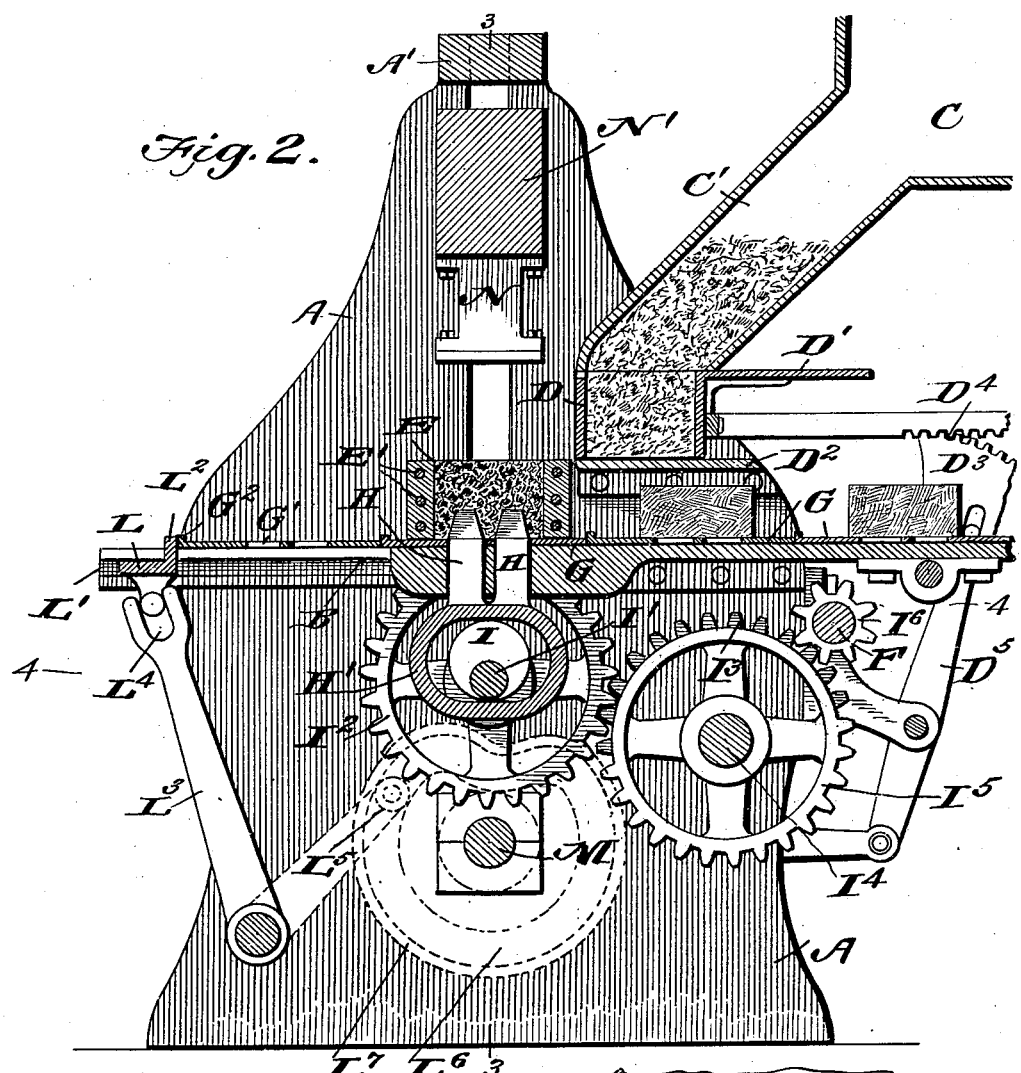
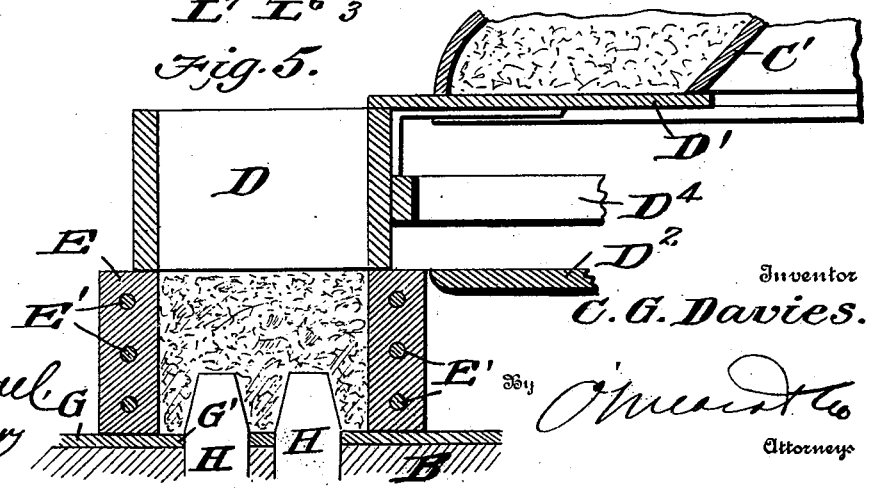
Witnesses
Inventor
C. G. Davies.

No. 700,746. Patented May 27, 1902.
C. G. DAVIES.
MACHINE FOR MOLDING BRICKS OR BLOCKS.
(Application filed Aug. 1, 1901.)
(No Model.) 4 Sheets—Sheet 3.
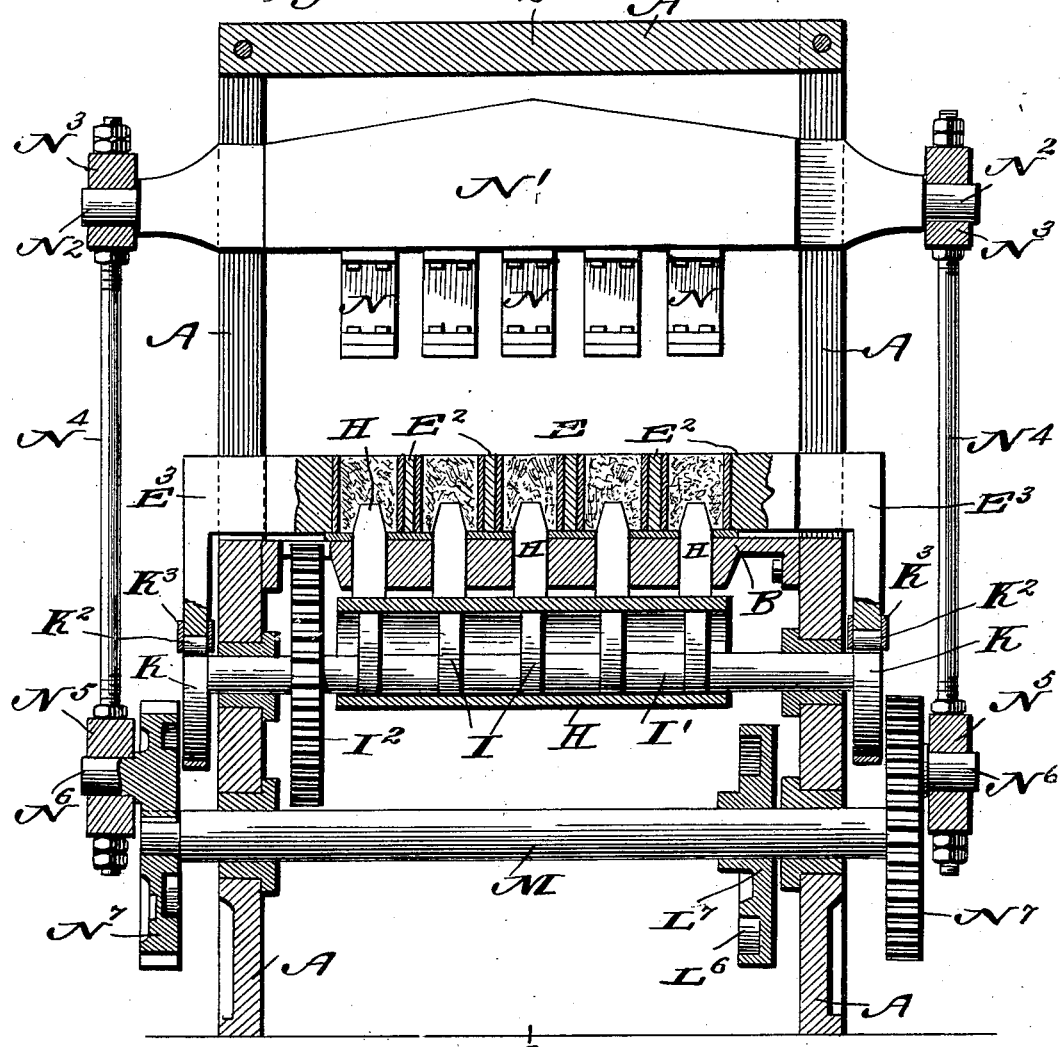
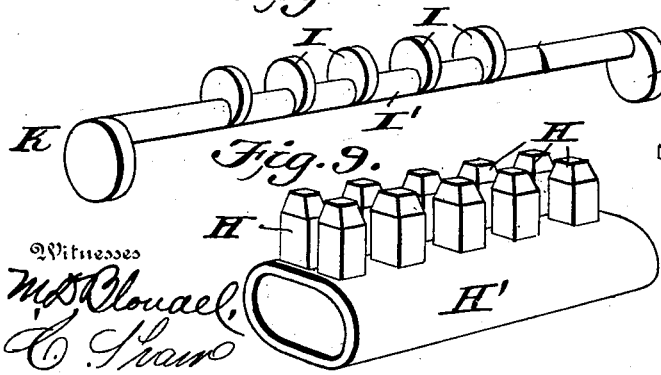
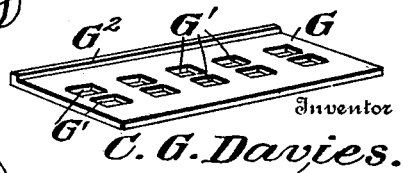
Inventor
C. G. Davies.
Witnesses
Attorneys No. 700,746. Patented May 27, 1902.
C. G. DAVIES.
MACHINE FOR MOLDING BRICKS OR BLOCKS.
(Application filed Aug. 1, 1901.)
(No Model.) 4 Sheets—Sheet 4.
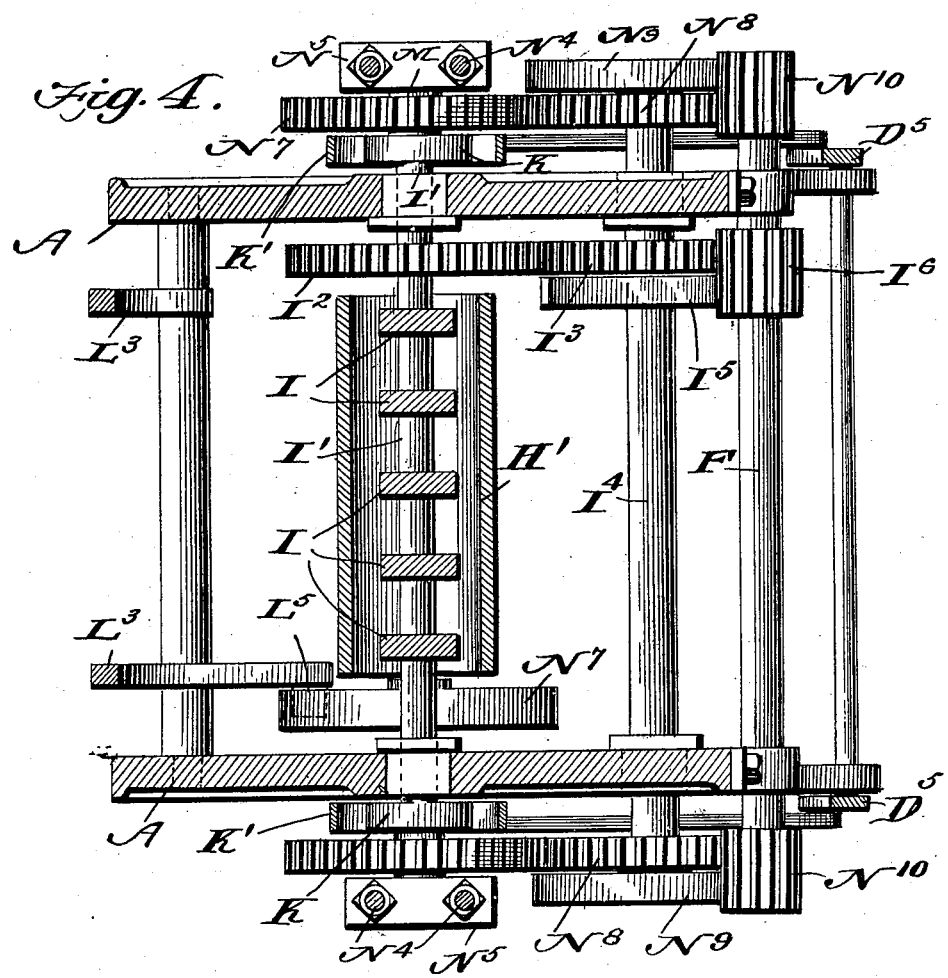
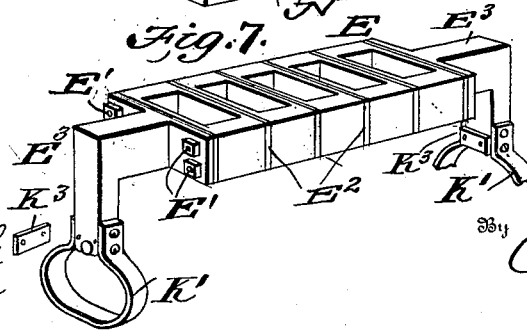
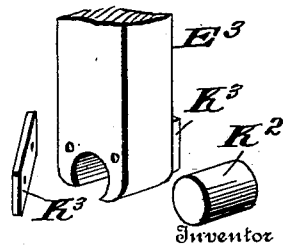

UNITED STATES PATENT OFFICE.

CHARLES G. DAVIES, OF BENTON HARBOR, MICHIGAN.

MACHINE FOR MOLDING BRICKS OR BLOCKS.

SPECIFICATION forming part of Letters Patent No. 700,746, dated May 27, 1902.

Application filed August 1, 1901. Serial No. 70,547. (No model.)

*To all whom it may concern:*

Be it known that I, CHARLES G. DAVIES, a subject of the King of Great Britain, residing at Benton Harbor, in the county of Berrien and State of Michigan, have invented a new and useful Machine for Molding Bricks or Blocks, of which the following is a specification.

This invention relates generally to a machine for molding bricks or building-blocks, and more particularly to one adapted to mold brick or block from a cohesive composite mass, such as a mixture of sand, cement, and other ingredients.

The object of this invention is to provide a machine by means of which a brick or block of the kind described can be quickly and easily made, and another object of the invention is to provide a machine by means of which a recessed block or brick can be made at a single operation.

Another object of the invention is to provide for the manufacture of a series of bricks at one operation, each brick or block being formed upon a plate by means of which the said block or brick can be removed from the machine, thereby avoiding the necessity of handling the molded brick or block.

With these objects in view the invention consists, essentially, in providing a vertically-movable mold-box, a horizontally-movable plate adapted to serve as a bottom to the mold-box, upwardly-movable plungers adapted to project into the mold-box through the bottom plate, the downwardly-movable plunger adapted to compress the material within the mold-box, an automatic feed-box for delivering a definite quantity of material to be molded and at the same time cutting off the general supply of such material, together with means for operating the above-mentioned parts in proper order.

The invention consists also in certain details of construction and novelties of combination and arrangement, all of which will be fully described hereinafter and pointed out in the claims.

In the drawings forming part of this specification, Figure 1 is a side elevation of a machine constructed in accordance with my invention. Fig. 2 is a vertical longitudinal section on the line 2 2 of Fig. 3. Fig. 3 is a transverse vertical section taken on the line 3 3 of Fig. 2. Fig. 4 is a horizontal sectional view on the line 4 4 of Fig. 2. Fig. 5 is an enlarged detail section of the feed-box and mold-box. Fig. 6 is a detail perspective view of the upper plungers and dies. Fig. 7 is a perspective view of the mold-box. Fig. 7ª is a detail perspective view showing the antifriction-bearing device connected to the lifting-frame of the mold-box. Fig. 8 is a detail perspective view of the shaft with eccentrics for operating the mold-box and the upwardly-movable plungers. Fig. 9 is a detail perspective view of the upwardly-projecting plungers and the sleeve to which they are attached. Fig. 10 is a detail perspective view of the plate serving as a bottom for the mold-box and through which the upwardly-movable plungers project.

In constructing a machine in accordance with my invention I employ a main frame comprising the upright sides A, connected at their upper ends by means of a cross-beam A' and intermediate their ends by means of a horizontal table B, said table being made considerably thicker at the center than at the ends for the purpose hereinafter fully explained. Convenient to the main frame of the machine is a hopper C, adapted to contain a material to be molded into bricks or blocks, said material being preferably a composition of sand, cement, and several other ingredients, though it will of course be understood that a machine constructed in accordance with my invention is adapted for molding blocks or bricks from any granular cohesive mass of material.

A discharge-chute C' leads from the hopper C and places the material into a horizontally-movable feed-box D, said feed-box sliding in suitable guideways arranged at the lower end of the chute and adapted to deliver a definite quantity of material into the mold-box E. The feed-box D has a rearwardly-projecting cut-off plate D', which closes the lower end of the chute C' when the box D is moved toward the center for the purpose of discharging the material into the mold-box. This feed-box D has no bottom, but rests upon a plate D², which extends entirely across the bed of the machine a short distance above the bed-plate and constitutes the bottom of the feed-box when the said feed-box is in its normal position beneath the lower end of the chute C'. The feed-box is operated by means of a toothed segment $D^3$ engaging a rack-bar $D^4$, connected to said feed-box, the toothed segment being operated by means of a lever $D^5$, said lever being rocked by means of a cam-groove disk $D^6$, mounted upon the main drive-shaft M, so that upon each revolution of the main shaft the feed-box will be moved centrally to discharge the material into the mold-box and outwardly to its normal position to receive another charge of material.

In practice I prefer to employ a series of mold-boxes, and in that case it will of course be necessary to employ a series of feed-boxes corresponding in number with the number of mold-boxes; but it will be distinctly understood that the construction and operation of the machine are the same no matter whether one or a number of mold-boxes is employed. Whenever a series of mold-boxes is employed, the said boxes are nested together side by side, as most clearly shown in Fig. 7, and are securely connected by means of bolts E', passing through the ends of the boxes, and between each pair of boxes is a plate $E^2$, and similar plates are arranged at the ends of the boxes between the right-angular castings $E^3$, which are securely bolted to the series of boxes at each end. The mold-box E rests upon the center of the bed-plate while receiving the material to be molded, and interposed between the said mold-box and the bed-plate is a horizontally-movable plate G, as most clearly shown in Fig. 10, said plate having a series of apertures G' intermediate its ends and at one edge is formed with an upwardly-projecting flange $G^2$. This plate constitutes the bottom of the mold-box and receives the material to be pressed or molded, and after the material has been so pressed or molded this plate serves to support and hold the molded block or brick and by means of which the said block or brick can be transported without injury. As before stated, the plates G have openings G' produced therein, and projecting upwardly through said openings are the plungers H, carried by a sleeve H', essentially oval in cross-section. These plungers H' are moved upwardly through the plate as the mold-box is being moved to a position to receive the material to be pressed, and in order to move the said plungers upwardly I employ a series of cams I, which are arranged within the sleeve H' and upon the shaft I', which passes centrally through the said sleeve and is provided with a gear $I^2$, which meshes with a mutilated gear $I^3$, mounted upon a shaft $I^4$, and adjacent to the mutilated gear $I^3$ is a complementary mutilated gear $I^5$, said mutilated portions meshing with a drive-pinion $I^6$, mounted upon a main drive-shaft F. By means of the mechanism herein described the plungers H will be moved upwardly through the plates G into the mold-box and permit it to remain there during the remaining operations of the machine, and after the remaining operations of the machine have been completed the plungers will then be withdrawn by the continued revolution of the mutilated gear.

Cams K are arranged upon the opposite ends of the shaft I' and work in the loops K', attached to the lower ends of the angular castings $E^3$, and in order to reduce the friction between said casting end and cam I provide an antifriction-roller $K^2$, which is located in the lower end of the said angular castings, as most clearly shown in Fig. 7ª, the said end being bored out to receive the roller, which is held in place by means of plates $K^3$, fastened upon opposite sides of the end of the angular casting. The cams K are arranged opposite to the cams I, so that their operation is directly opposite the operation of the cams I. The angular castings $E^3$ are connected to the opposite ends of the mold-box, so that when the plungers H are being forced upwardly through the plates G the mold-box is being moved vertically downward, and when the mold-box is moved vertically upward the plungers H are withdrawn from the die-plate, thereby permitting the said plate to be moved laterally along the bed-plate, carrying with it the molded block or brick, and in order to move the said plate laterally I employ a sliding bar L, which slides in guideways L', produced in the bed-plate, said bar having an upwardly-projecting finger $L^2$, which is adapted to engage the flange $G^2$ upon the plate and force the same along the bed-plate, said finger $L^2$ working in a longitudinal slot produced in said bed-plate. By reference to Fig. 2 it will be noted that the finger $L^2$ operates upon the plate G, which rests upon the bed-plate to one side of the center, and this plate in turn contacts with the plate upon which the brick or block is being molded, the empty plate serving to shift the loaded plate laterally and at the same time is brought into a position ready to receive the next charge of material to be molded.

In order to operate the bar L, I employ an elbow-lever $L^3$, which is slotted at its upper end, as shown at $L^4$, for engaging the depending finger of the bar L, the lower end of the elbow-lever carrying an antifriction-roller $L^5$, which travels in the cam-groove $L^6$, produced in the face of the disk $L^7$, mounted upon the shaft M.

In order to compress the material within the mold-box, I employ a downwardly-acting plunger N, and in practice I prefer to use a number of plungers, each plunger being adapted to enter one of the compartments of the mold-box. The plungers N are attached to a rigid cross-bar N', which works in vertical guideways produced in the sides of the main frame, the extending ends of the said cross-bar being shaped into trunnions $N^2$, which are journaled in boxes $N^3$, connected to the draw-rods $N^4$, said draw-rods being in turn connected to boxes N⁵ at their lower ends, said boxes receiving the crank-pins N⁶, carried by the gears N⁷, mounted at opposite ends of the shaft M, said gears N⁷ meshing with mutilated gears N⁸, each mutilated gear N⁸ having a complementary mutilated gear N⁹ adjacent thereto, the said mutilated gears N⁸ and N⁹ meshing with the pinions N¹⁰, mounted upon the ends of the main driveshaft F. By this construction the plungers N are forced downwardly into the mold-box after the said mold-box has been lowered, the plungers H raised, and the feed-box operated for the purpose of discharging its contents into the mold-box.

In Fig. 2 I have shown the position of the various parts after the mold-box has been filled and just prior to the descent of the plungers, the feed-box having been returned to its normal position for the purpose of receiving another charge of material. The plungers N are then forced downwardly by means just described, and the material within the mold-box is tightly compressed. During the pressing operation of the plungers N the plungers H remain stationary, and the material is therefore forced evenly against the sides of the mold-box, with the result of producing a brick or block with exceedingly smooth faces or sides, and at the same time a series of recesses are produced in the rear faces of the brick or block, thereby reducing its weight, so that a brick or block of composite material such as I use will not weigh more than the ordinary clay brick now in common use. After the brick or block has been compressed the rotation of the shaft I' will cause the cams I to withdraw the plungers H through the plates, and at the same time the mold-box will be moved vertically upward, thereby leaving the molded brick or block upon the plate. It will thus be noted that the upper ends of the plungers H are beveled or tapered so they can be easily forced through the openings G' in the plate G, and they, of course, can be withdrawn with equal facility. As soon as the mold-box is moved upwardly and the plungers N also moved upwardly the elbow-lever L³ will begin to operate, forcing the bar L toward the center of the machine and operating upon the empty die-plate G, which in turn forces the loaded plate horizontally to the right and places the empty plate in position to receive the mold-box. As soon as the empty plate is pushed across the center of the bed-plate the plungers H begin to move upwardly and the mold-box downwardly, and as soon as the mold-box has been firmly seated upon the plate and the plungers forced upwardly to their limit the feed-box moves horizontally to the center of the machine, discharging its contents into the mold-box and simultaneously cutting off the general supply of material. As soon as the feed-box discharges its contents it is quickly returned to its receiving position and the compressing operations of the machine then take place, as heretofore described.

It will thus be seen that I provide a machine by means of which a series of composite bricks or blocks can be quickly and easily molded, and it will also be noted that by molding the said blocks or bricks upon a movable plate I am enabled to quickly and easily remove the said blocks or bricks from the machine without injury to the said blocks or bricks.

Having thus fully described my invention, what I claim as new, and desire to secure by Letters Patent of the United States, is—

1. In a machine of the kind described, the combination with a vertically-movable mold-box, of a laterally-movable plate adapted to be moved beneath the lower end of the mold-box, a horizontally-movable feed-box adapted to be moved across the upper end of the mold-box for the purpose of filling the said mold-box, the upwardly-movable plunger adapted to be projected through the plate and into the lower end of the mold-box, the downwardly-movable plunger adapted to be projected into the upper end of the mold-box, and means for operating the mold-box, plate, feed-box, lower and upper plungers, substantially as shown and described.

2. In a machine of the kind described, the combination with the mold-box movable vertically, of a plate having openings therein, the said plate being adapted to be moved horizontally beneath the mold-box, a downwardly-movable plunger and an upwardly-movable plunger, said upwardly-movable plunger being adapted to be projected through the plate into the lower portion of the mold-box, the upper end of said upwardly-movable plunger being tapered or beveled, together with means for moving the mold-box, plate and upper and lower plungers, substantially as shown and described.

3. In a machine of the kind described, the combination with the main frame having a bed-plate, of a plunger working upwardly through the said bed-plate, a plate slidably arranged upon the bed-plate, said plate having one or more openings through which the upwardly-movable plunger is adapted to project, a mold-box movable vertically and adapted to normally rest upon the plate, a downwardly-acting plunger, and means for operating the mold-box, plate, and the upper and lower plungers, substantially as shown and described.

4. In a machine of the kind described, the combination with the main frame having a bed-plate, the central portion of which has one or more openings produced therein, a plunger working upwardly through the said central portion, a plate having one or more apertures intermediate its ends and provided with a flange at one end, two or more of said plates being adapted to be arranged in series upon the bed-plate, the mold-box adapted to rest upon one of the die-plates, the downwardly-movable plunger, the sliding bar adapted to contact with one of the die-plates for the purpose of operating upon the series of die-plates, and means for moving the upper and lower plungers, mold-box, and sliding bar, substantially as shown and described.

5. In a machine of the kind described, the plate having one or more openings, said plate having a flange at one side, substantially as and for the purpose described.

6. In a machine of the kind described, the combination with the main frame, of a mold-box having castings connected to its opposite ends, said castings working in vertical guideways produced in the main frame, the ends of the said castings having strap-loops attached thereto, and provided with an antifriction-bearing device, a rotary shaft having cams at its opposite ends adapted to operate in the strap-loops and upon the ends of the castings, whereby the mold-box is raised and lowered, substantially as shown and described.

7. In a machine of the kind described, the combination with the main frame having a bed-plate formed with one or more openings, of a plunger adapted to be projected through the said openings, a sleeve to which the plunger is attached, and a rotary shaft arranged within the sleeve and carrying one or more cams adapted to operate upon the said sleeve whereby the plunger is raised or lowered, substantially as and for the purpose described.

8. In a machine of the kind described, the combination with the main frame having an apertured bed-plate, of a mold-box having castings at one end working through guideways in the main frame and carrying strap-loops at their lower ends, and provided with antifriction-bearing devices, the plates having openings adapted to correspond with the openings in the bed-plates, the plunger adapted to be projected through the bed-plate and plate and into the lower end of the mold-box, the sleeve to which the plunger is attached, the rotary shaft having oppositely-disposed cams, one set of cams being adapted to raise and lower the mold-box, the other set being adapted to raise and lower the plunger, and means for rotating the shaft carrying the cams, substantially as shown and described.

9. In a machine of the kind described, a series of mold-boxes arranged side by side, plates interposed between the said boxes, angular castings connected to the end boxes, the lower ends of said angular castings carrying antifriction-rollers and having strap-loops attached to the said ends, substantially as shown and described.

10. The combination with the main frame, having a bed-plate, of a vertically-movable mold-box, a downwardly-acting plunger, two or more plates, one of which is adapted to rest beneath the mold-box to receive the blocks or bricks, the slide-bar adapted to contact with the empty plate, said empty plate being adapted to engage the loaded plate, and means for operating the plunger, mold-box, and sliding bar, substantially as shown and described.

CHARLES G. DAVIES.

Witnesses:
CHAS. E. BROCK,
M. D. BLONDEL.